(12) United States Patent
Bobeczko et al.

(10) Patent No.: US 6,557,742 B1
(45) Date of Patent: May 6, 2003

(54) DRIVE ROLLER FOR WIRE FEEDING MECHANISM

(75) Inventors: James D. Bobeczko, Concord Township, OH (US); Thaddeus A. Kasiewicz, Girard, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 0 days.

(21) Appl. No.: 09/836,871

(22) Filed: Apr. 18, 2001

(51) Int. Cl.$^7$ ............................................... B65H 20/02
(52) U.S. Cl. ........................ 226/186; 226/177; 226/193
(58) Field of Search ................................. 226/177, 186, 226/188, 193

(56) References Cited

U.S. PATENT DOCUMENTS

| | | | | |
|---|---|---|---|---|
| 2,271,723 A | * | 2/1942 | Trainer | 226/186 X |
| 2,525,590 A | * | 10/1950 | Collins | 226/177 |
| 2,603,343 A | * | 7/1952 | Payne | 226/186 X |
| 2,906,913 A | * | 9/1959 | Catlett | 226/186 X |
| 3,052,393 A | * | 9/1962 | McKenzie | 226/177 |
| 3,207,401 A | * | 9/1965 | Everett | 226/177 |
| 4,889,271 A | * | 12/1989 | Kurokawa | 226/186 |
| 5,816,466 A | | 10/1998 | Seufer | |
| 5,981,906 A | | 11/1999 | Parker | |

* cited by examiner

Primary Examiner—Kathy Matecki
Assistant Examiner—Minh-Chau Pham
(74) Attorney, Agent, or Firm—Fay, Sharpe, Fagan, Minnich & McKee

(57) ABSTRACT

A wire feeding mechanism suitable for advancing ferrous and nonferrous wire along a pathway without causing damage to the wire, including a plurality of drive rollers stationed in opposing pairs along the pathway, each comprising a cylindrical hub and a flexible cover extending thereabout. The flexible covers conform to the cross-sectional contour of the wire therebetween under the compressive forces generated by the opposing drive rollers as the wire is driven along the pathway.

7 Claims, 5 Drawing Sheets

DRIVE ROLLER FOR WIRE FEEDING MECHANISM

INCORPORATION BY REFERENCE

Seufer, U.S. Pat. No. 5,816,466, and Parker, U.S. Pat. No. 5,981,906, are incorporated herein by reference for background information.

BACKGROUND OF THE INVENTION

The subject invention relates to the art of wire feeding mechanisms and more particularly to drive rollers in wire feeding mechanisms that are used to driveably advance welding wire.

Wire feeding mechanisms have been provided heretofore, and generally, as shown in Seufer for example, have a wire pathway through which a continuous length of wire is advanced. Positioned on opposing sides of the wire pathway is at least one steel drive roller. Each steel drive roller is mounted on a roller support, and all of the roller supports are driveably engaged with one another. Accordingly, all of the steel drive rollers rotate in response to the movement of the corresponding roller support and thereby act to driveably advance the continuous length of wire. In order to impart an advancing force and motion to the wire, the opposing steel drive rollers are positioned sufficiently close to, one another so that the wire extending along the pathway is compressed between the opposing rollers. The compressive force in combination with the coefficient of friction, between the material of the wire and the steel roller, produces a frictional force along the wire which is greater than the force required to advance the continuous length of wire. As a result, the wire is advanced in a generally smooth and continuous motion in response to the rotation of the steel drive rollers.

Wire feeding mechanisms of the foregoing nature are utilized in a variety of applications. In many such applications, including welding operations, the advancing wire is subjected to a variety of non-uniform radial and axial impact loads. These loads normally react back through the wire to the feeding mechanism, at which point one of three results will normally occur. One result may be that the impact load will be absorbed by the system creating a minimal amount of slippage between the drive rollers and the wire causing only a brief change in wire feed speed (WFS). It will be appreciated that a consistent wire feed speed is critical to a high quality welding operation, and that anything more than a momentary deviation from the set WFS will result in low quality or failed welding operations. A second result is that the impact force reacting back to the feeding mechanism through the wire will exceed the frictional force between the steel drive rollers and the wire, and cause the drive rollers to slide against the surface of the wire causing the wire to become galled and deformed, and resulting in an extended deviation of the WFS from that desired. As previously indicated this may cause a significant reduction in the quality of the welding operation. What's more, this causes additional impact loads to be created as the galled and deformed section of wire travels along the wire pathway. These additional impact loads react back to the wire feeding mechanism potentially initiating the cycle over and over again. Furthermore, the galled and deformed wire section will not melt uniformly during the welding operation resulting in inconsistent and lower quality welds. A third result is that the impact force will not exceed the frictional force between the drive rollers and the wire, but will exceed the column strength of the wire causing the wire to bend out of the pathway and become caught inside the wire feeding mechanism, resulting in a "bird nest" inside the wire feeder. Once the wire is bent out of the wire pathway the wire cannot be advanced along the pathway. Likewise, the wire being fed behind the bent wire portion cannot advance along the pathway and therefore becomes bent itself. In just a few seconds, a large number of bent wire segments have piled up adjacent the wire feeding device. At this point, production must be stopped and the wire feeding mechanism disassembled so that the "bird nest" can be cut out. The wire feeder can then be reassembled and production resumed. This creates a significant loss in production time, wire and other materials.

As can be appreciated from the foregoing discussion, a wire feeding mechanism can be made to function quite well if the wire being fed has a high column strength value. In such case, the compression force from the steel drive rollers can be set very high, creating a high friction force which resists sliding of the wire against the drive rollers in reaction to impact loads. Since the wire will not slide against the steel drive rollers, the impact loads will act as a column load on the advancing wire. However, if the column strength of the wire is high, then the wire will not be bent by the column load and the wire will continue to be fed to the downstream welding operation.

It will be further appreciated that the column strength of a length of round wire is dependent upon the diameter of the wire, and the material from which the wire is made. Steel wire can be made to work well in wire feeding mechanisms of the foregoing description. However, many nonferrous metals, such as aluminum, for example, are soft and do not possess sufficient column strength to permit problem-free operation of a wire feeding mechanism. As a result, if the compressive force from the steel drive rollers is low enough to avoid exceeding the column strength of the wire as impact loads react back to the wire feeding mechanism, then the resulting frictional force will be low enough to allow the wire to slide against the steel drive rollers and become galled and deformed. Furthermore, if the compressive force from the steel drive rollers is high enough to prevent sliding, the impact loads will often exceed the column strength of the nonferrous wire and cause a "bird nest." Additionally, the steel drive rollers of the wire feeding mechanism tend to deform the relatively soft nonferrous wires regardless of the value of the compressive forces used. This further increases the likelihood of impact loads, and also reduces the consistency of the melt of the wire causing low quality welding of nonferrous metals. It will be appreciated for the foregoing reasons that the compressive forces cannot simply be reduced to minimize the deformation. As a result, traditional wire feeding mechanisms cannot provide the desired trouble-free operation when feeding nonferrous wires.

SUMMARY OF THE INVENTION

In accordance with the present invention, a drive roller is provided for a wire feeding mechanism which enables avoiding or minimizing the problems and difficulties encountered with the use of feed devices of the foregoing character, while promoting and maintaining the desired trouble-free operation, simplicity of structure, and economy of manufacture thereof. More particularly in this respect, a drive roller in accordance with the present invention includes a hub and a flexible outer cover, and a wire feeding mechanism incorporating drive rollers according to the present invention includes a wire pathway along which a continuous length of wire extends, and at least two drive rollers mounted on opposite sides of the wire pathway, each having a hub and a flexible outer cover. The drive rollers on one side of the wire pathway are radially adjustable relative to the opposing drive rollers. By changing the radial position of the adjustable drive rollers, the compressive force of the drive rollers on the wire extending therebetween is increased or decreased. With nonferrous wire, the traditional steel drive rollers of existing wire feeding mechanisms would increasingly deform the wire as the compression force was increased. The flexible covers of the drive rollers of the subject invention, however, deform as the compression force between the drive rollers is increased while the nonferrous wire does not. As a result, without damaging or deforming the nonferrous wire, significantly higher compressive forces can be maintained between the subject drive rollers and nonferrous wire than could be maintained between traditional steel drive rollers and nonferrous wire. This results in the ability to create a higher frictional force between the drive rollers and the wire, and this in turn provides increased ability to withstand impact loads without the wire sliding relative to the rollers.

Furthermore, the flexible covering of the drive rollers in the subject invention increasingly conforms to the arcuate surface contour of the wire as the drive rollers are brought closer to the wire pathway, whereby the compressive force is progressively increased on the wire. This acts to provide additional support and stability to the wire as it exits the drive rollers at the point which buckling of the wire due to low column strength begins to become an issue. It is well known that column strength is most directly related to the unsupported length and radius of a cylindrical column. However, the end conditions of the column are also important. As can be appreciated, a drive roller that provides a greater degree of radial support by conforming to the outside surface of the wire will provide a more rigid and more stable end condition. As such, the flexible covering of the drive rollers in the subject invention is able to provide an improved end condition, and therefore increased column strength over traditional steel drive rollers. The foregoing discussion is centered around nonferrous wire, for which column strength is a more significant issue. However, the drive rollers of the subject invention are suitable for use on ferrous and other types of wire as well, and provide the same benefits as discussed above, and hereinafter.

Finally, it is well known that the coefficient of friction is due to the interengagement of surface imperfections between two adjacent surfaces. The traditional steel drive rollers generally have relatively smooth surfaces contacting the wire so that the wire is not damaged by the contact of the drive roller. However, such a smooth surface has a relatively low coefficient of friction leading to a lower frictional force resulting between the wire and the drive rollers. The only way to increase the frictional force without increasing the compression force of the drive rollers is to increase the coefficient of friction between the drive rollers and the wire. This can be best accomplished by reducing the surface finish of the drive roller to make the surface contacting the wire rougher. However, as previously indicated, a rough finish on the traditional steel drive rollers will damage the wire and contribute to undesirable impact loads. However, with the drive rollers of the subject invention the surface finish can be made as rough or as smooth as is necessary to increase or decrease the coefficient of friction as desired without causing any damage to the wire. Additionally, the material of the flexible cover of the drive rollers in the subject invention may be selected from a wide variety of materials, including both plastics and rubbers. These materials can be compounded with a wide variety of additives to further increase or reduce the coefficient of friction and improve operation of the wire feeding mechanism.

It is accordingly an outstanding object of the present invention to provide a drive roller for a wire feeding mechanism having a flexible outer surface that is adapted to driveably advance a continuous length of welding wire in a consistent and effective manner without deforming or otherwise damaging the wire as it advances through the wire feeding mechanism.

Another object is the provision of a drive roller of the foregoing character in which the outer surfaces of opposed drive rollers conform to the wire as the wire extends therebetween, and thereby more fully provides radial support of the wire to improve the column strength thereof.

Still another object is the provision of a drive roller of the foregoing character in which the wire contacting surface of the drive roller can be formed from any one of a variety of different materials, such as plastic or rubber, and can have a variety of different surface finishes or conditions to increase or decrease the coefficient of friction with the wire being advanced.

A further object is the provision of a drive roller of the foregoing character which is easily maintained, and is comprised of a minimal number of parts and is structurally simple, thereby promoting the economic production of the drive rollers.

Yet a further object is the provision of a wire feeding mechanism incorporating drive rollers of the foregoing character, whereby a continuous length of welding wire can be advanced through the feeding mechanism in a consistent and effective manner without determining or otherwise damaging the wire.

BRIEF DESCRIPTION OF THE DRAWINGS

The foregoing objects, and others, will in part be obvious and in part pointed out more fully hereinafter in conjunction with a written description of preferred embodiments of the invention illustrated in the accompanying drawings in which.

DESCRIPTION OF PREFERRED EMBODIMENTS

Figure 1:
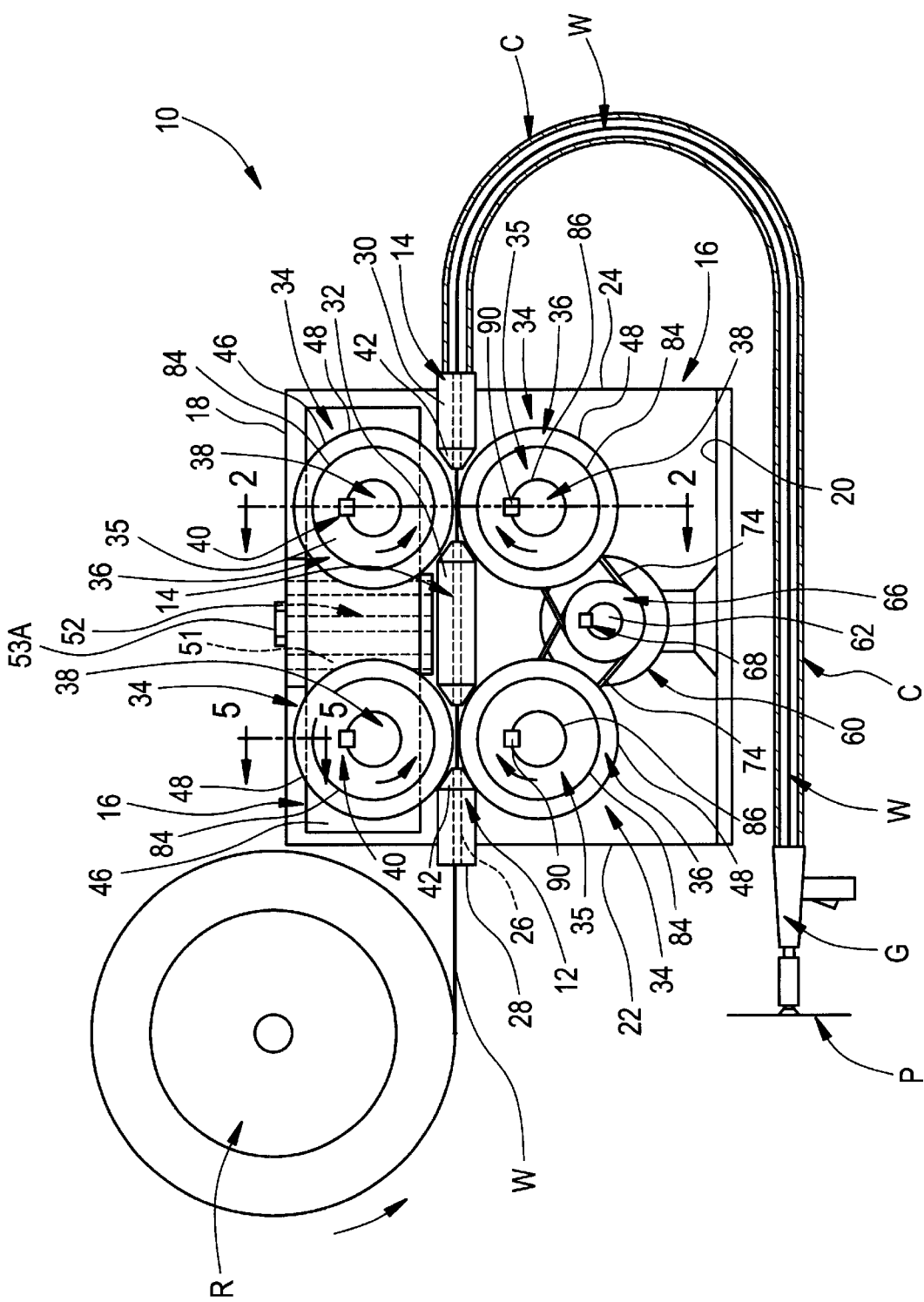
FIG. 1 is a front view of one embodiment of a wire feeding mechanism having drive rollers in accordance with the present invention.

Referring now in greater detail to the drawings, wherein the showings are for the purpose of illustrating preferred embodiments of the invention only and not for the purpose of limiting the invention, FIG. 1 of the drawings illustrates a wire feeding mechanism 10 having a wire pathway 12 defined in part by wire support guides 14. Wire feeding mechanism 10 is generally situated between a bulk supply of wire W and a workpiece P. Wire W extends from the bulk supply, shown as roll R in FIG. 1, to wire feeding mechanism 10, and further extends to workpiece P where it is consumed in the process of welding. Generally, a flexible conduit C extends from mechanism 10 at one end of pathway 12, such that wire W will be advanced by mechanism 10 through conduit C to a welding gun G adjacent workpiece P. As mechanism 10 axially advances wire W along pathway 12, the advancing wire is radially supported and guided by flexible conduit C toward workpiece P until wire W reaches gun G and is consumed during the welding process. It will be appreciated that both flexible conduit and welding guns are commonly known and therefore need not be described in detail hereinafter. Additionally, it will be appreciated that wire feeding mechanisms are generally well known and are commonly used in both automatic and semiautomatic welding systems. Therefore, the wire may be supplied in a wide variety of bulk forms, such as boxes or rolls or reels, and the wire may be introduced to the welding operation and workpiece through a rigid conduit terminating at a welding head or a flexible conduit terminating at a welding gun as previously described.

Figure 2:
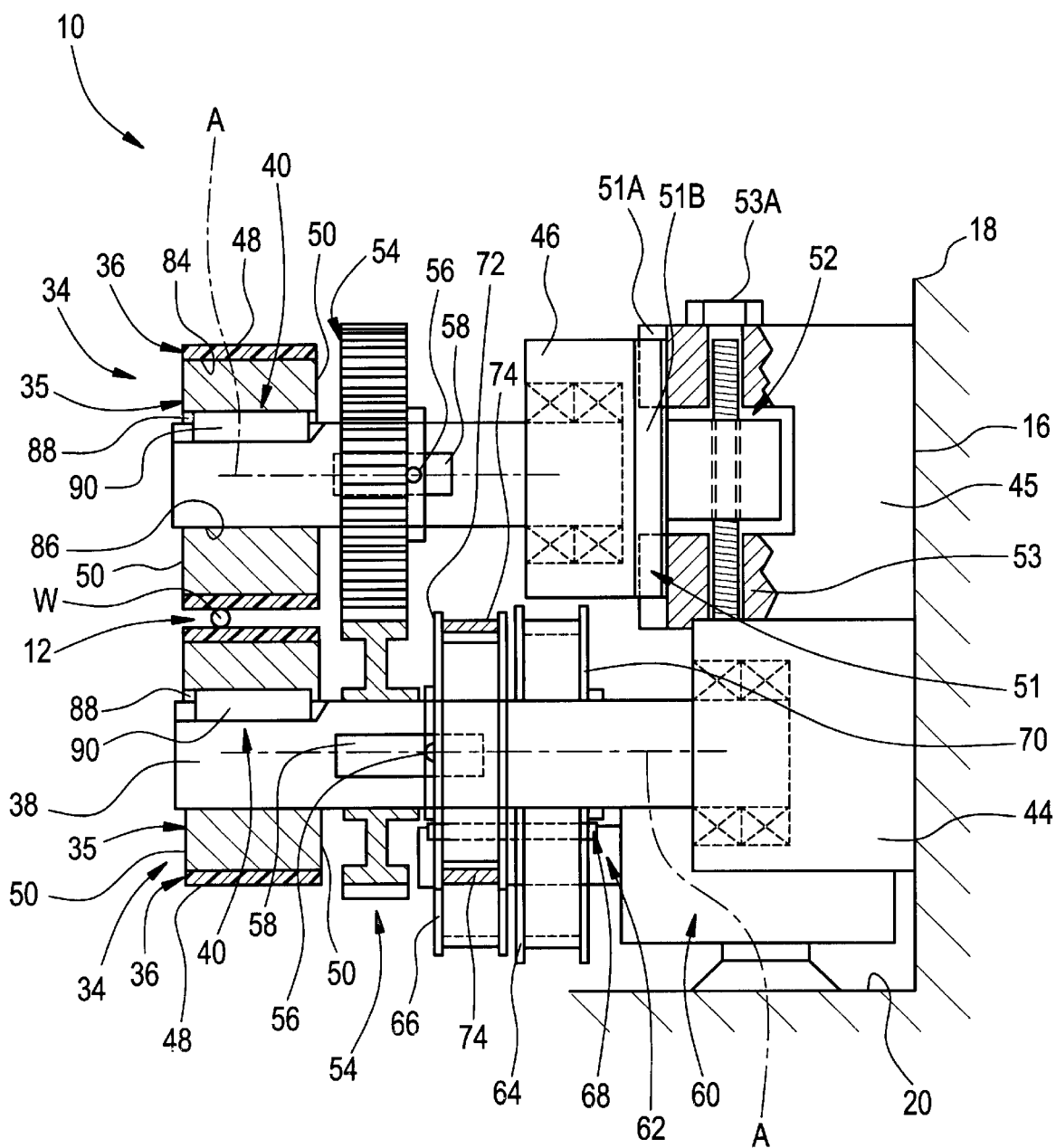
FIG. 2 is a partial cross-sectional side elevation view of the wire feeding mechanism and drive rollers taken along line 2—2 in FIG. 1.

Having described the basic environment and function of wire feeding mechanism 10, FIGS. 1 and 2 show mechanism 10 having a housing 16 with a top 18, a bottom 20, a first end 22, and a second end 24 with pathway 12 extending between ends 22 and 24. Spaced apart along pathway 12 are a plurality of wire support guides 14 each having a wire passage 26 therethrough. Guides 14 are oriented such that passages 26 thereof are axially aligned along and partially define pathway 12. Guides 14 include a first guide 28 adjacent first end 22, a second guide 30 adjacent second end 24, and a center guide 32 spaced between guides 28 and 30. At least one end of each guide 28, 30 and 32 has a tapered surface 42 providing a reduced outside diameter at the end of the guide. As will be more fully described hereinafter, a plurality of drive rollers 34 are disposed in pairs along pathway 12. One drive roller 34 from each pair is on one side of pathway 12, and the other roller 34 from each pair is on the opposite side of pathway 12. Each roller 34 in each pair of rollers is positioned radially adjacent pathway 12 and tangentially contacts wire W. The tapered surfaces 42 allow support guides 14 to be closely positioned adjacent the opposing pairs of drive rollers 34, thereby providing optimum guidance and support for wire W extending between rollers 34.

As will be described in greater detail hereinafter, each drive roller 34 in accordance with the invention comprises a cylindrical hub 35 and a flexible cover 36 providing a cylindrical outside surface 48. Hub 35 has a pair of spaced apart ends 50 between which cover 36 extends. Each roller 34 is on a corresponding roller support shaft 38 having an axis A with which the roller 34 is coaxial. The axes of drive rollers 34 extend generally with one another and transverse to pathway 12. As previously discussed, rollers 34 are disposed in pairs along pathway 12 with the rollers of each pair being supported on opposite sides of pathway 12 so that the outside surfaces thereof contact opposite sides of wire W extending therebetween along path 12. Shafts 38 are rotatably supported by the corresponding one of lower bearing block 44 and upper bearing block 46, which blocks are in turn supported on housing 16. Upper bearing block 46 is supported on a mounting block 45 on housing 16. Extending between blocks 45 and 46 is an adjustment mechanism 52 for radially positioning the corresponding support shaft and the roller supported thereby relative to the shaft and roller therebeneath. Accordingly, the gap between outside surfaces 48 of the opposing pairs of rollers 34 can be increased or decreased to respectively increase or decrease the compressive forces of the rollers on wire W. Adjustment mechanism 52 includes a dovetail slide 51 having a slide way portion 51A on block 45 and a sliding member portion 51B on block 46. Slide 51 rigidly supports block 46 on block 45 while permitting relative movement therebetween to radially position the corresponding support shafts and rollers supported thereby as previously discussed. A threaded member 53 having a head 53A axially extends between blocks 45 and 46, generally parallel with the direction of movement of block 46 on block 45 through slide 51. Member 53 is axially fixed on block 45, and rotatable thereon by rotation of head 53A. Block 46 threadably engages and thereby supports member 53. Accordingly, block 46 is displaced along slide 51 in response to the rotation of member 53, thereby adjusting the relative radial position of the corresponding shafts and rollers thereon. It will be appreciated that any one of a variety of alternate mechanisms could be used in place of dovetail slide 51 to support block 46 on block 45.

Drive rollers 34 are mounted on the corresponding roller support 38 for rotation therewith by a key and keyway arrangement 40, though any suitable driving arrangement can be used. Additionally, the roller support shafts for each opposing pair of drive rollers 34 are driveably interengaged with one another such that rotation of one shaft 38 rotates the opposing shaft, whereby the opposing rollers 34 rotate to driveably advance wire W extending therebetween. Roller support shafts 38 are drivingly interengaged by gears 54 that are retained on shafts 38 by any suitable mechanism, such as a set screw 56 threadably received on gear 54 and engaging a retaining flat 58 on shaft 38. It will be appreciated that gears 54 have sufficient clearance between the teeth thereof to accommodate any relative radial movement of rollers 34 due to adjustment of mechanism 52. A motor 60 is supported by housing 16, and has an output shaft 62 extending therefrom. A first pulley 64 and a second pulley 66 are driveably mounted on shaft 62 axially adjacent one another by a key and keyway arrangement 68, and a third pulley 70 and fourth pulley 72 are each mounted on a different one of the roller support shafts 38 extending from lower bearing block 44, and are axially aligned with pulleys 64 and 66, respectively.

Third and fourth pulleys, 70 and 72, are driveably retained on shafts 38 by a suitable mechanism, such as set screw 56 threadably received on pulleys 70 and 72 and engaging retaining flats 58 on shafts 38. Rotary motion is generated by motor 60 and output through shaft 62, and pulleys 64 and 66, are torsionally rigid with respect to shaft 62 and accordingly rotate therewith. Belts 74 extend between first and third pulleys 64 and 70, and between second and fourth pulleys 70 and 72, and transmit rotary movement from the first and second pulleys to the third and fourth pulleys as such output is generated by motor 60. Third and fourth pulleys 70 and 72 are torsionally rigid with respect to the roller support shaft on which each pulley is mounted, and accordingly transmit rotary movement imparted by belts 74 to the respective roller support shafts. As previously indicated, the roller support shafts of each pair of opposing rollers are interengaged by gears 54. Accordingly, as the roller support shafts connected to lower bearing block 44 are rotated, the roller support shafts connected to upper bearing block 46 are rotated through gears 54. It will be appreciated that the drive rollers of each opposing pair will directionally rotate opposite one another and thereby provide the forces and movement necessary to advance wire W along pathway 12. It will be further appreciated that motor 60 may be of a variable speed type so that the wire feed speed (WFS) of the wire may be increased or decreased as necessary.

Additionally, it will be appreciated that the compressive forces of the drive rollers on wire W can be increased or decreased by moving the opposing drive rollers closer together or farther apart as conditions dictate.

Figure 3:
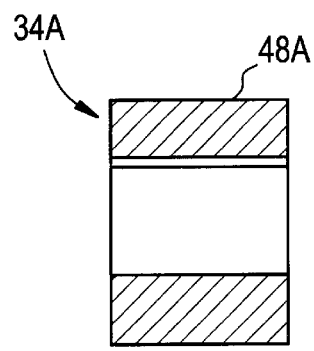
FIG. 3 is a cross-sectional view of a prior art steel drive roller.
Figure 3A:
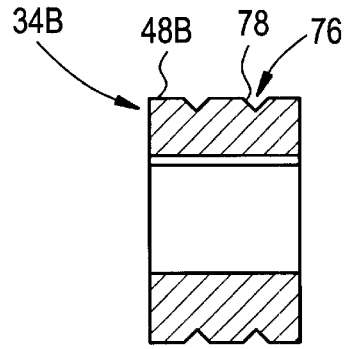
FIG. 3A is a cross-sectional view of another prior art drive roller.
Figure 4:
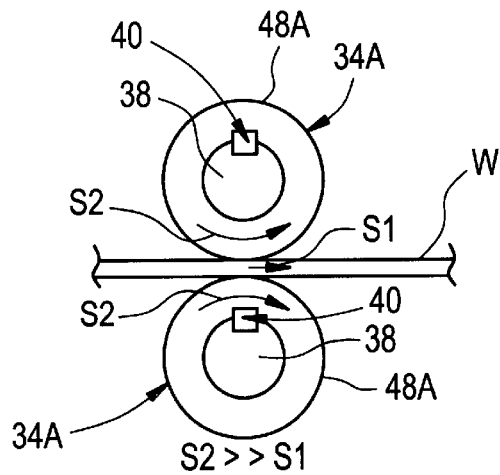
FIG. 4 is a front view of a prior art wire feeding mechanism having steel drive rollers engaging a welding wire therebetween.
Figure 9:
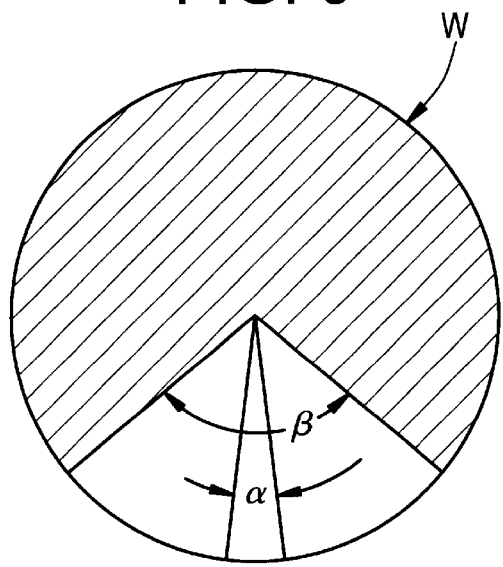
FIG. 9 is a cross-sectional view of a welding wire indicating the amount of wire surface that is contacted by both a prior art steel drive roller and a drive roller in accordance with the present invention.
Figure 10:
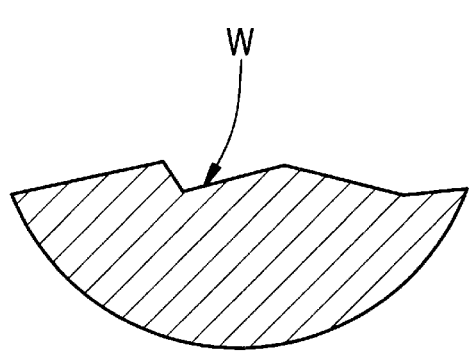
FIG. 10 is a partial cross-sectional view of a nonferrous welding wire.
Figure 10A:
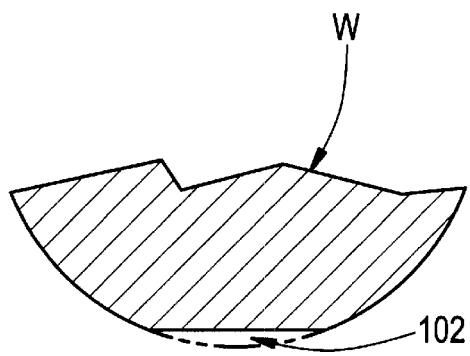
FIG. 10A is a partial cross-sectional view showing the wire of FIG. 10 after being compressed between prior art steel drive rollers; and, FIG. 11 is a partial cross-sectional view of another embodiment of a drive roller according to the invention.

Having described the basic structure and operation of wire feeding mechanism 10, drive rollers 34 and the interface between rollers 34 and wire W will now be described in detail. Heretofore, prior art drive rollers 34A, as shown in FIGS. 3 and 4, have been made of steel and have been hardened so that the compressive force of the rollers on welding wire does not cause the outside surface 48A of the rollers to become damaged or deformed. It will be appreciated that a cross-section of wire W will reveal wire to be generally round, as shown in FIGS. 9 and 10. It will be further appreciated that the compressive forces on a generally round wire W advanced between two opposing and transversely mounted cylindrical rollers 34A will result in deformation 102 of wire W as shown in FIG. 10A. The material characteristics of welding wire will largely determine the magnitude or amount the wire is deformed as a result of the compressive forces. As a result, a wire made from a material having a relatively high compressive yield strength, such as steel, will be deformed less than a wire made from a material having a moderate compressive yield strength, such as aluminum. The deformation of welding wire from the compressive forces of steel rollers has been somewhat reduced by the provision of a roller such as that shown in FIG. 3A having at least one V-shaped groove 76 having walls 78 extending circumferentially about outside surface 48B of the roller. In use of the latter, welding wire extends between two opposing drive rollers 34B such that the wire contacts rollers 34B at groove walls 78 thereof. Accordingly, the compressive forces from rollers 34B act on and deform the wire at four points rather than only two points as with a pair of rollers 34A. As a result, the net shape of a wire advanced by rollers 34B is closer to round than a wire advanced by rollers 34A having no grooves, but none the less is undesirably deformed. It will be appreciated that it is ineffective to reduce the compressive forces between the prior art drive rollers as a method of reducing the deformation of welding wire because the reduction of the compressive force results in a corresponding reduction in the frictional force available to advance the wire. The reduced frictional force may cause drive rollers 34A or 34B to slip relative to the wire and, therefore, either fail to advance the wire or advance the wire at a wire feed speed S1 that is reduced from the desired rate that would correspond to the rotational speed S2 of the drive rollers, as shown in FIG. 4. In either case, the resulting interruption in the wire feed adversely affects the integrity of the weld being formed, and slippage between the rollers and wire can deform the wire and/or damage the driving surfaces of the rollers.

Figure 5:
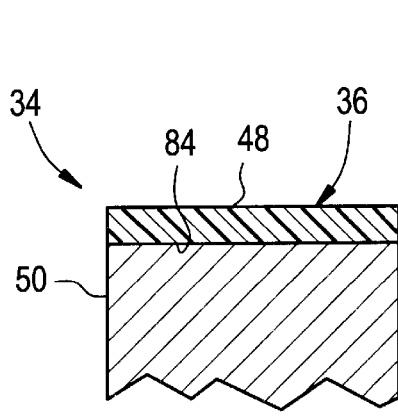
FIG. 5 is a cross-sectional view of a drive roller according to the present invention taken along line 5—5 of FIG. 1.
Figure 5A:
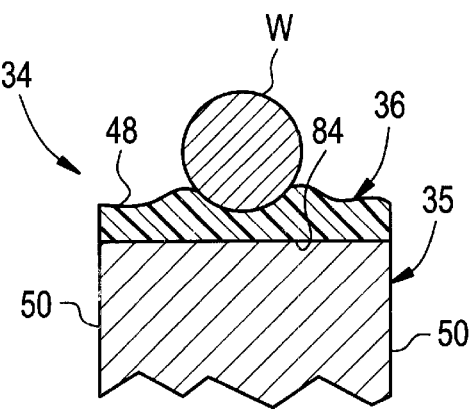
FIG. 5A is a cross-sectional view of the roller of FIG. 5 shown with a wire compressively positioned against the drive roller.
Figures 8A, 8B, 8C, 8D:
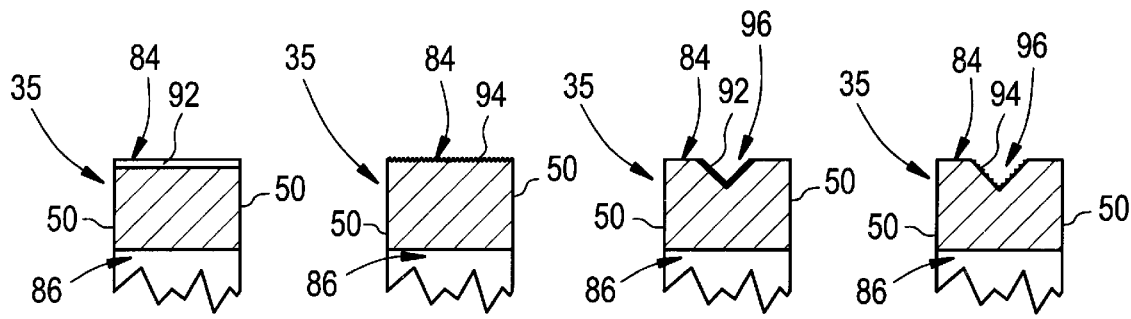
FIGS. 8A–8D are cross-sectional views of different embodiments of a support hub for a roller according to the invention.

In accordance with the present invention, drive roller 34 includes a hub 35 and a flexible outer cover 36 as set forth hereinabove. As best seen in FIGS. 1, 2 and 5, hub 35 has a cylindrical outer surface 84 that extends between ends 50 of the hub, a bore 86 extending between ends 50 and a keyway 88 for receiving key 90 of key and keyway arrangement 40 by which the roller is mounted on shaft 38. Flexible outer cover 36 extends radially from outer surface 84 of hub 35 and terminates at cylindrical outside surface 48. Hub 35 is made from metal, preferably steel, and outer surface 84 thereof may, as opposed to being smooth, include axially extending serrations 92 or a knurl 94, as shown in FIGS. 8A and 8B, respectively. Cover 36 is made from a material having a relatively low compressive yield strength, preferably plastic or rubber, so that the cover and thus outside surface 48 thereof will deflect or deform and thus conform to the cross-sectional contour of a wire W in response to the compressive forces generated as the wire extends between opposing drive rollers 34, as is illustrated with respect to one of the rollers in FIG. 5A. Such conformity increases surface area contact and support between the drive rollers and the wire thus promoting the desired frictional force to advance the wire, and also eliminates the deformation of wire resulting from the use of steel rollers as shown in FIG. 10A and discussed above. More particularly in this respect, the maximum amount of surface contact between prior art rollers 34A or 34B and a welding wire is proportional to the amount the wire is deformed, shown as angle "α" in FIG. 9. However, the surface contact between drive rollers 34, in accordance with the invention, is illustrated by angle "β" of FIG. 9. It will be appreciated that this increased surface contact results from the conformity of the flexible outer cover to the wire as the wire is continuously advanced between each pair of opposing drive rollers 34.

Figure 6:
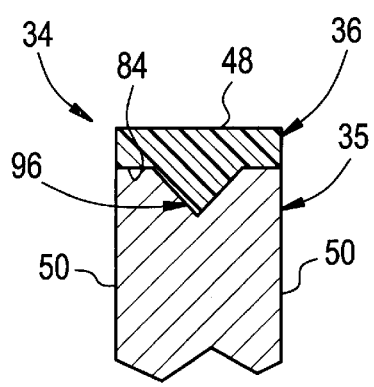
FIG. 6 is a cross-sectional view of an alternate embodiment of a drive roller in accordance with the invention.
Figure 6A:
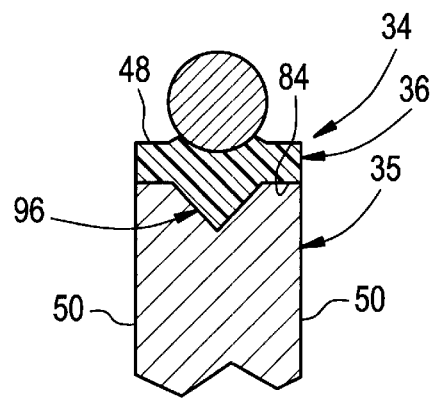
FIG. 6A is a cross-sectional view of the roller of FIG. 6 shown with a wire compressively positioned against the drive roller.
Figure 7:
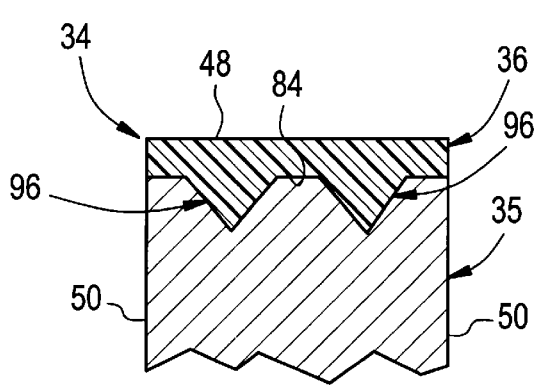
FIG. 7 is a cross-sectional view of another embodiment of a drive roller according to the invention.
Figure 7A:
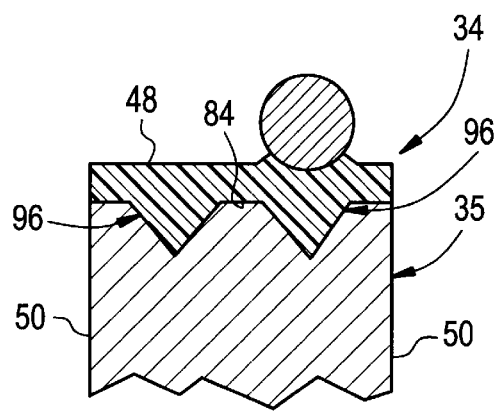
FIG. 7A is a cross-sectional view of the roller of FIG. 7 shown with a wire compressively positioned against the drive roller.

FIGS. 6 and 6A show an alternative embodiment of drive roller 34 having a hub 35 that includes a circumferentially extending V-shaped groove 96 in outside surface 84 and into which outer cover 36 extends. The material of cover 36 extending into groove 96 provides for increased deflection of outside surface 48 allowing cover 36 to better conform to wire W. FIGS. 8C and 8D, respectively, show groove 96 as having axially extending serrations 92 or a knurled surface 94 to improve the torsional rigidity of cover 36 on hub 35. In yet another alternative embodiment, FIGS. 7 and 7A show drive roller 34 having an increased axial length and including two V-shaped grooves 96 extending circumferentially about hub 35. In this embodiment, the drive roller can be selectively mounted on wire feeding mechanism 10, whereby the second groove can be associated with pathway 12 after the cover material adjacent the first groove becomes worn.

It will be appreciated that a wide variety of materials will have characteristics suitable for use as a flexible outer cover 36. Accordingly, the frictional properties of such materials may also be considered when selecting a material for cover 36, particularly the coefficient of sliding friction. An increase in the coefficient of sliding friction will increase the friction force used to advance wire W by a proportional amount without a corresponding increase in the compressive force of the drive rollers on the wire. Importantly, such an increase in the coefficient of friction is not possible with the steel drive rollers used heretofore, because the frictional properties of steel cannot be significantly changed without increasing the roughness of at least one of the two interacting surfaces. It will be appreciated that increasing the roughness of the outside surface of the steel rollers would significantly damage and deform the wire passing therebetween.

Figure 11:
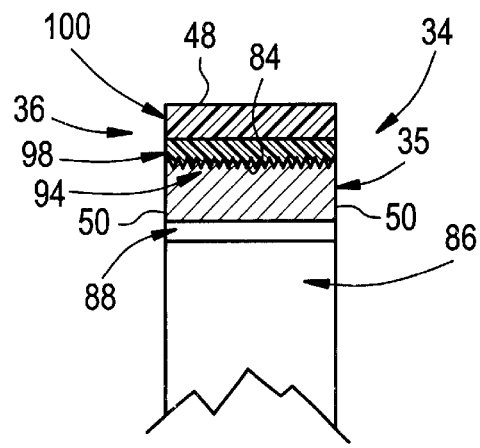

Additionally, it will be appreciated that flexible outer cover 36 may be comprised of two or more materials, each having a different compressive yield strength. In this respect, as shown in FIG. 11, a first layer 98 radially adjacent outer surface 84 of hub 35 may be of a material having increased mechanical strength properties to more securely bond with and torsionally attach the cover to hub 35. The first material may be rather rigid and securely engage the outer surface of the hub which may be provided with knurling or with serrations 92 as shown in FIG. 11. A second layer 100, radially outwardly adjacent first layer 98 provides cover outside surface 48 and, accordingly, may have decreased mechanical strength properties, including a low compressive yield strength to more easily conform to the contour of wire W. The first and second layers are bonded or otherwise joined together to form a contiguous outer cover 36.

While considerable emphasis has been placed herein on the structures and structural interrelationships between the component parts of the embodiments disclosed, it will be appreciated that other embodiments of the invention can be made and that many changes can be made in the embodiments illustrated and described without departing from the principles of the invention. In this respect, for example, the grooves in the rollers can be other than V-shaped, and the knurling and serrations on the outer surfaces and/or grooves of the rollers can partially cover the surface as opposed to completely covering the same. Moreover, both serrations and knurling can be combined on a given outer surface, and the outer surfaces of the rollers can be textured other than by knurling or serrations to promote a bond between the hub and the flexible cover. Accordingly, it is to be distinctly understood that the foregoing descriptive matter is to be interpreted merely as illustrative of the present invention and not as a limitation.

Having thus described the invention, it is so claimed:

1. A drive roller for use on a wire feeding mechanism to advance a continuous length of wire, said drive roller comprising:
   a hub having an axis and an outer surface extending circumferentially about said axis;
   a flexible cover on said outer surface and extending circumferentially thereabout;
   said outer surface of said hub is cylindrical; and,
   at least a portion of said outer surface of said hub is axially serrated.

2. A drive roller for use on a wire feeding mechanism to advance a continuous length of wire, said drive roller comprising:
   a hub having an axis and an outer surface extending circumferentially about said axis;
   a flexible cover on said outer surface and extending circumferentially thereabout;
   said outer surface of said hub is cylindrical;
   said outer surface includes at least one groove extending circumferentially therearound;
   said at least one groove is V-shaped; and,
   walls of said at least one V-shaped groove are at least partially serrated.

3. A drive roller for use on a wire feeding mechanism to advance a continuous length of wire, said drive roller comprising:
   a hub having an axis and an outer surface extending circumferentially about said axis;
   a flexible cover on said outer surface and extending circumferentially thereabout;
   said outer surface of said hub is cylindrical;
   said outer surface includes at least one groove extending circumferentially therearound;
   said at least one groove is V-shaped; and,
   walls of said at least one V-shaped groove are at least partially knurled.

4. A wire feeding mechanism for advancing a continuous length of wire along a pathway, said wire feeding mechanism comprising:
   a housing having two roller supports each rotatable about a corresponding axis transverse to said pathway, said roller supports being on opposite sides of said pathway and being driveably engaged with each other;
   a drive roller on each roller support for rotation therewith and having a roller axis coaxial with the axis of the corresponding roller support, said driver roller comprising a hub having an outer surface extending circumferentially about said roller axis, and a flexible cover on said outer surface and extending circumferentially thereabout;
   said flexible cover of each of said drive rollers tangentially and compressively contacting a continuous length of wire therebetween such that the wire is advanced along said pathway in response to the rotation of said drive rollers;
   at least one of said drive rollers is radially adjustably positionable relative to said pathway;
   said outer surface of said hub is cylindrical;
   said outer surface includes at least one groove extending circumferentially therearound;
   said at least one groove is V-shaped; and,
   walls of said at least one V-shaped groove are at least partially serrated.

5. A wire feeding mechanism for advancing a continuous length of wire along a pathway, said wire feeding mechanism comprising:
   a housing having two roller supports each rotatable about a corresponding axis transverse to said pathway, said roller supports being on opposite sides of said pathway and being driveably engaged with each other;
   a drive roller on each roller support for rotation therewith and having a roller axis coaxial with the axis of the corresponding roller support, said driver roller comprising a hub having an outer surface extending circumferentially about said roller axis, and a flexible cover on said outer surface and extending circumferentially thereabout;
   said flexible cover of each of said drive rollers tangentially and compressively contacting a continuous length of wire therebetween such that the wire is advanced along said pathway in response to the rotation of said drive rollers;
   at least one of said drive rollers is radially adjustably positionable relative to said pathway;

said outer surface of said hub is cylindrical;

said outer surface includes at least one groove extending circumferentially therearound;

said at least one groove is V-shaped; and, walls of said at least one V-shaped groove are at least partially knurled.

6. A wire feeding mechanism for advancing a continuous length of wire along a pathway, said wire feeding mechanism comprising:

a housing having two roller supports each rotatable about a corresponding axis transverse to said pathway, said roller supports being on opposite sides of said pathway and being driveably engaged with each other;

a drive roller on each roller support for rotation therewith and having a roller axis coaxial with the axis of the corresponding roller support, said driver roller comprising a hub having an outer surface extending circumferentially about said roller axis, and a flexible cover on said outer surface and extending circumferentially thereabout;

said flexible cover of each of said drive rollers tangentially and compressively contacting a continuous length of wire therebetween such that the wire is advanced along said pathway in response to the rotation of said drive rollers;

said outer surface of said hub is cylindrical;

said outer surface includes at least one groove extending circumferentially therearound;

said at least one groove is V-shaped; and, walls of said at least one V-shaped groove are at least partially serrated.

7. A wire feeding mechanism for advancing a continuous length of wire along a pathway, said wire feeding mechanism comprising:

a housing having two roller supports each rotatable about a corresponding axis transverse to said pathway, said roller supports being on opposite sides of said pathway and being driveably engaged with each other;

a drive roller on each roller support for rotation therewith and having a roller axis coaxial with the axis of the corresponding roller support, said driver roller comprising a hub having an outer surface extending circumferentially about said roller axis, and a flexible cover on said outer surface and extending circumferentially thereabout;

said flexible cover of each of said drive rollers tangentially and compressively contacting a continuous length of wire therebetween such that the wire is advanced along said pathway in response to the rotation of said drive rollers;

said outer surface of said hub is cylindrical;

said outer surface includes at least one groove extending circumferentially therearound;

said at least one groove is V-shaped; and, walls of said at least one V-shaped groove are at least partially knurled.

* * * * *